United States Patent
Heighway et al.

(10) Patent No.: US 7,254,662 B2
(45) Date of Patent: Aug. 7, 2007

(54) DATA LINK LAYER DEVICE FOR A SERIAL COMMUNICATION BUS

(75) Inventors: Timothy Heighway, Northants (GB);
Klaus Gaedke, Hannover (DE);
Siegfried Schweidler, Gehrden (DE)

(73) Assignee: Thomas Licensing, Boulogne (FR)

( * ) Notice: Subject to any disclaimer, the term of this patent is extended or adjusted under 35 U.S.C. 154(b) by 0 days.

(21) Appl. No.: 10/520,049

(22) PCT Filed: Jun. 17, 2003

(86) PCT No.: PCT/EP03/06368

§ 371 (c)(1),
(2), (4) Date: Dec. 29, 2004

(87) PCT Pub. No.: WO2004/004256

PCT Pub. Date: Jan. 8, 2004

(65) Prior Publication Data

US 2005/0262283 A1    Nov. 24, 2005

(30) Foreign Application Priority Data

Jun. 29, 2002   (EP) ................................ 02090227

(51) Int. Cl.
*G06F 13/14* (2006.01)
(52) U.S. Cl. ........................................ 710/305; 327/18
(58) Field of Classification Search ........ 370/447–448, 370/450–451, 458–459; 710/305; 327/18
See application file for complete search history.

(56) References Cited

U.S. PATENT DOCUMENTS 5,687,174 A    11/1997   Edem et al.

6,683,848 B1 *  1/2004   Parrish ........................ 370/218

(Continued)

OTHER PUBLICATIONS

R. Brand: "Iso-Ethernet: Bridging the Gap from WAN to LAN" Data Communications, McGraw-Hill, New York, US, vol. 24, No. 9, Jul. 1, 1985, pp. 103-104,106,108.

(Continued)

*Primary Examiner*—Rehana Perveen
*Assistant Examiner*—Clifford Knoll
(74) *Attorney, Agent, or Firm*—Joseph J. Laks; Robert B. Levy; Catherine A. Ferguson (57) ABSTRACT

According to the IEEE1394 bus protocol, priority is given to isochronous data packets. Data transfer is done in transfer cycles under the control of a cycle master. It depends on the allocated bandwidth for isochronous data how much transport capacity is available in a transfer cycle. To managed the mixed data transfer in one cycle it is specified that the bus nodes not having isochronous data to transfer need to wait with their transmission requests until the end of the isochronous data transfers in the cycle indicated with a sub-action gap. The invention aims to improve the efficiency of data transport for the case that none of the bus nodes need to transfer isochronous data. The data link layer devices according to the invention includes means for checking whether isochronous data is to be transferred and if not they switch over to a no cycle master state, in which the local cycle synchronization events are ignored. The nodes need not wait for a sub-action gap after a local cycle event before drawing asynchronous transmission requests.

5 Claims, 5 Drawing Sheets

U.S. PATENT DOCUMENTS 6,771,668 B2 * 8/2004 Fukunaga et al. .......... 370/489

OTHER PUBLICATIONS

M. Tenner: "A bus on a diet-the serial bus alternative-an introduction to the P1394 High Performance Serial Bus", Intellectual Leverage. San Francisco, Feb. 24-28, 1992, Proceedings of the Computer Society of International Conf., vol. CONF 37, Feb. 24, 1992, pp. 316-321.

The Search Report Date Sep. 29, 2003.

* cited by examiner

DATA LINK LAYER DEVICE FOR A SERIAL COMMUNICATION BUS

This application claims the benefit, under 35 U.S.C. §365 of International Application PCT/EP03/06368, filed Jun. 17, 2003, which was published in accordance with PCT Article 21(2) on Jan. 8, 2004 in English and which claims the benefit of European patent application No. 02090227.6, filed Jun. 29, 2002.

FIELD OF THE INVENTION

The invention relates to the field of data communication over a serial communication bus. More particularly the invention relates to a data link layer device for such a serial communication bus.

BACKGROUND OF THE INVENTION

For quite a long time now the convergence of the product sectors of consumer electronics (HiFi, video, audio) on one side and personal computers on the other have been trumpeted under the catchword multimedia and have actually been propelled by many manufacturers from both camps. The merging of the two product sectors means that work concerned with the subject of data exchange between the equipment of the different product sectors or else between the equipment within one product sector is becoming more and more significant. This is also apparent from the efforts for standardization with regard to this subject, which are already well advanced. Specifically, the so-called IEEE1394 serial bus already provides an internationally standardized and very widely accepted bus for data exchange between terminals from both product groups. The precise designation of the afore-mentioned standard is:

IEEE1394 standard for high performance serial bus, (IEEE) STD 1394/1995, IEEE New York, Aug. 1996.

The invention that is to be described here is concerned with the bus management. This IEEE1394 bus provides the service of isochronous data transfer as well as asynchronous data transfer. In this connection isochronous data transfer means that data to be transmitted arrives regularly at a data source the data also arriving with approximately the same size each time. Examples of such data sources are video recorders or camcorders, DVD players, audio devices such as CD players or MP3 players and the like. The asynchronous transfer mode is used for all the other data transfers including control commands and configuration messages, which are not as critical as in the case of streaming video or audio.

The specification of the IEEE1394 serial bus comprises a series of criteria, which are highly significant for products from the sector of consumer electronics:

Virtually freely selectable bus topology (e.g. chain, tree . . . ) with up to 63 terminals, Bit serial data transmission over a cable with 4 or 6 conductors with the maximum distance of 4.5 meters between two pieces of equipment, Transmission rates of up to 400 MBit/s at present, Terminals can be connected and disconnected during operation (life insertion).

In order to produce an IEEE1394 interface it is necessary to implement two layers of the IEEE1394 standard using hardware: These are the physical layer and data link layer which are known from the OSI/IEC-7-Layer reference model of data communication. The connection to the bus is managed with the physical layer, while essential parts of the bus protocol are implemented in the data link layer. Since the galvanic separation between the physical layer and the data link layer is provided in the 1394 standard the implementation is generally effected using separate IC's.

In a given configuration of the 1394 bus the bus management assures that the bus is shared for transportation of isochronous data packets as well as asynchronous data packets in a fair manner, this is basically done by introducing a so-called cycle master in the network. It is a bus node with cycle master capability that will be assigned as cycle master. This bus node provides for time synchronisation for all bus nodes in the network by means of transmitting in a regular intervals cycle start packets. Every bus node has to resynchronise its time clock after reception of a cycle start packet. To assure this synchronization process, in each of the bus nodes there is a cycle timer running, that generates with its own time clock local cycle synchronization events. After the local cycle synchronization event a bus node will wait for the reception of the cycle start packet before making own transmission requests. After reception of a cycle start packet a bus node will wait for a short isochronous gap before generating a transmission request for isochronous data if any has become due. Each of the nodes having made isochronous transmission requests will get access to the bus during the nominal cycle period. This is assured by an isochronous resource manager that is also established in the 1394 standard. If the data transport capacity of the 1394 bus has not been seized by the isochronous manager, all the other nodes having made asynchronous transmission requests can access to the bus after elapse of a certain amount of time called sub-action gap. The rest of the cycle period is, therefore, dedicated for asynchronous transmissions.

The shortly explained bus management procedure where the isochronous data transport capacity is guaranteed and the remaining data transport capacity is reserved for asynchronous transmissions has the following drawback:

In case of the use of the IEEE1394 bus for serial communication between devices that do not need to transfer isochronous data, the bus management with the cycle master and dedicated cycle periods is not the most efficient one. Each bus node has to wait for the reception of the cycle start packet after each local cycle synchronization event and also it has to wait for the sub-action gab before it can request asynchronous transmission. This is somehow a waste of time namely the transmission time for the cycle start packet as well as the waiting time for the sub-action gap. During this time in each of the cycle periods no data transport can take place.

SUMMARY OF THE INVENTION

It is an object of the invention to overcome the above-explained drawback of the bus management in an IEEE1394 bus based on a cycle master in cycle periods. In other words it is the object of the invention to disclose an improved bus management with a more efficient use of the data transport capacity of the serial bus.

These and other objects are achieved with the measures listed in independent claims 1 and 3. According to claim 1 the solution consists in the provision of configuration means in a data link layer device for a serial communication bus with which the generation or submission of a cycle start packet in succession to a local cycle synchronization event are disabled in response to a predetermined condition in order to support a no cycle master transfer mode.

In the case of claim 1 the data link layer device is itself the cycle master in the network but before acting as a cycle master this data link layer device checks whether an isochronous resource manager has actually allocated band-widths for the isochronous data transfer. If this is not the case, the data link layer device according to the invention will switch over into a no cycle master state and will not produce the cycle start packets in order to improve the efficiency of data transport.

Independent claim 3 discloses another solution according to the invention from the point of view of a data link layer device being integrated in a bus node that either does not have cycle master capability or acts as cycle slave i.e. it did not try or succeed to become the cycle master in the bus. For such a data link layer device it is advantageous to implement means for checking whether a cycle master exists in the network and if not activating configuration means that switch over to a no cycle master mode. In this mode, the generation of asynchronous transmission requests is enabled without waiting for a cycle start packet and an asynchronous data transfer raster is enabled.

With both implementations, it is possible to increase data transport capacity in the network.

Further improvements of the data link layer device as defined in claim 3 are possible by virtue of the measures evinced in the dependent claims 4 and 5. There are two possibilities how to check whether a cycle master exists in the network. One is based on the evaluation of the self-identification packets from all the nodes in the network stored in the internal memory of the data link layer device. After a bus reset each bus node, i.e. each data link layer device collects all the self-identification packets transmitted from the bus nodes in the bus reset phase and stores them in its internal memory. According to the IEEE1394 standard the self-identification packet has the format that there is an entry existing that indicates that the corresponding node is a contender for an isochronous resource manager. If in none of the self-identification packets this entry is set, it is clear that nobody on the net would like to transfer isochronous data packets and, therefore, each data link layer device can switch over to the no cycle master state.

An alternative solution for checking whether a cycle master exists in the network consists in the provision of a first counter counting clock pulses of a reference clock, the counter generating a cycle synchronisation event each time after a predetermined counting interval and a second counter that is incremented each time that no cycle start packet has been received in succession to a cycle synchronization event and if the second counter reaches a predetermined value the switching over to the no cycle master transfer mode is done.

BRIEF DESCRIPTION OF THE DRAWINGS

Exemplary embodiments of the invention are illustrated in the drawings and are explained in more detail in the following description.

In the figures.

Figure 1:
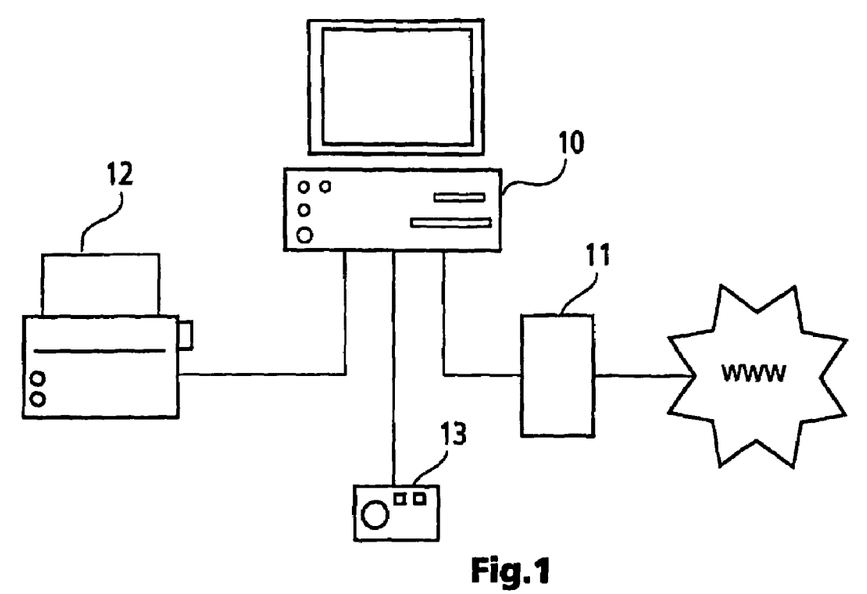
FIG. 1 shows an example of an IEEE1394 bus configuration with a personal computer, XDSL modem, printer and digital still camera.

In FIG. 1 reference number 10 denotes a personal computer. To the personal computer 10 is connected via 1394 cables an XDSL modem 11, a printer 12 and a digital still camera 13. The XDSL modem 11 is connected to the telephone line and over this line has access to the Internet. The personal computer 10 needs to be equipped with at least a 3 port 1394 physical layer IC in order to be able to handle all connections to the peripheral devices 11 to 13. The bus configuration such as shown in FIG. 1 is characterized by the fact that none of the peripheral devices 11 to 12 have the capability of transmitting or receiving isochronous data packets. There is no streaming audio or video possible with a printer, a digital still camera or an XDSL modem according to this embodiment. The personal computer 10 can have the capability to receive and send isochronous data packets but in this configuration it will not make use of this capability because none of the peripheral devices can manage these isochronous data packets. All the traffic on the 1394 bus will therefore relate to asynchronous transmissions.

Figure 2:
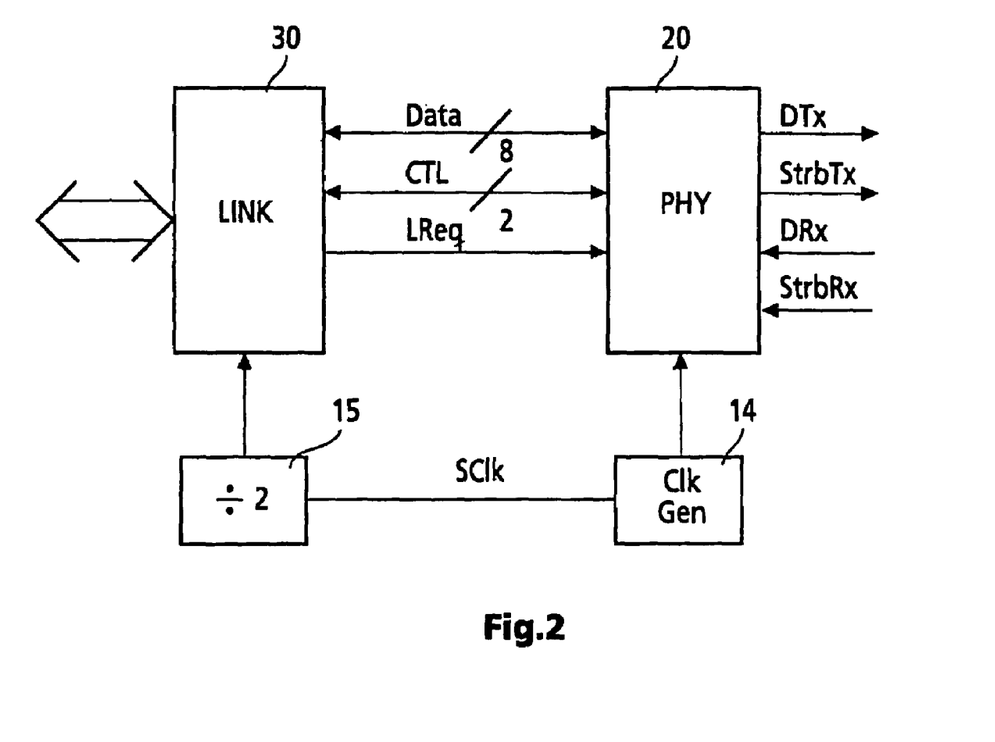
FIG. 2 shows a simple block diagram for an IEEE1394 interface.

FIG. 2 shows the principle structure of an IEEE1394 interface. Two of the communication layers according to the OSI/ISO reference model of data communication need to be implemented by hardware. These are the physical layer and the data link layer. According to the IEEE1394 standard a galvanic insulation between the physical layer circuit and the data link layer circuit may be implemented. Therefore, in FIG. 2 two separate IC's are depicted for the data link layer and the physical layer. Reference number 20 denotes the IC for the physical layer and reference number 30 denotes the IC for the data link layer. The physical layer IC is connected to the 1394 bus lines DTx, StrbTX, DRx, and StrbRx. Also shown are the connection lines between the physical layer IC 20 and the data link layer IC 30. There are up to 8 lines dedicated to the data bit transfer, two lines are dedicated to the control between both IC's and there is a link request line LReq from the link IC to PHY-IC. Depicted is also the connection of the link IC to an external microcontroller without listing the details of this connection. Also shown is a clock generator 14 that delivers a quartz stabilized clock of 49.512 MHz to the PHY-IC 20. This clock signal is also fed to a divide by two circuit 15 that reduces the clock frequency to the half of the clock generator 14. The reduced clock signal at 24.576 MHz is delivered to the link IC 30. This clock is used to increment a 32-bit cycle timer register in the link IC 30 which will be explained later on in further detail. In another embodiment of the invention the divide by two circuit is integrated in the link IC.

Figure 3:
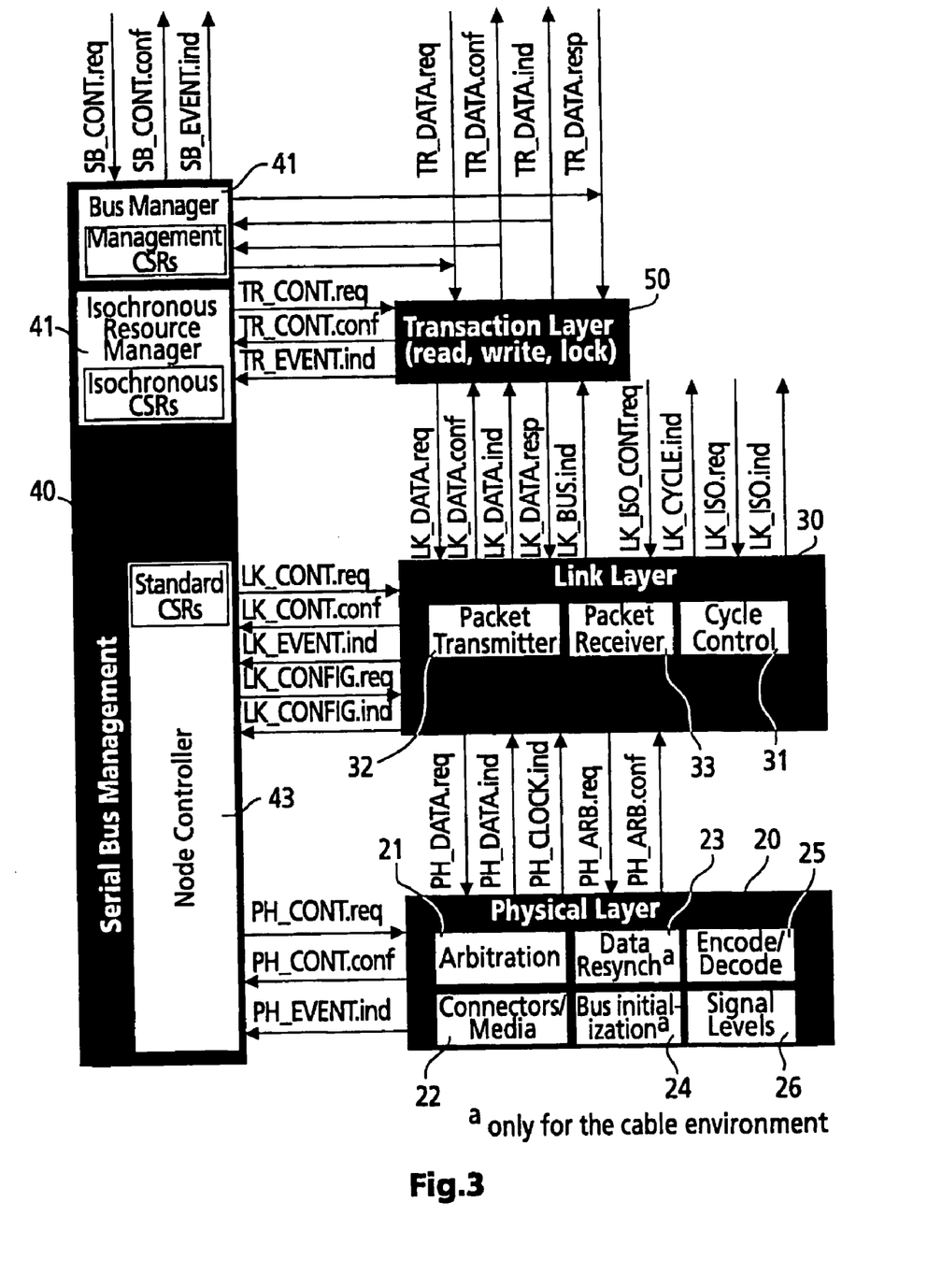
FIG. 3 shows the IEEE1394 serial bus protocol stack.

FIG. 3 shows the bus protocol stack such as shown in the IEEE1394 bus standard. Separately shown is on the right side the physical layer 20, the data link layer 30 and the transaction layer 50. All of the upper layers are not specified in the IEEE1394 bus standard. On the left side of FIG. 3 are shown the serial bus management software tools like a bus manager 41, an isochronous resource manager 42 and a node controller 43. These tools are realized mostly by means of software running on a microcontroller of the respective 1394 bus node. The same applies to the transaction layer implementation. Only the physical layer and the data link layer are implemented by means of hardware. Important parts for the physical layer 20 are the following components. An arbitration logic 21, a connector/media logic 22, a data re-synchronization logic 23, a bus initialisation logic 24, an encoding/decoding logic 25 that serves for data strobe encoding/decoding and a bus signal level generation and decoding logic 26. For the complete details to the different logic and to the physical layer functionality it is referred to the IEEE1394 bus standard itself.

More important for the present invention is the implementation of the data link layer protocol 30. FIG. 3 depicts three separate components such as cycle control logic 31, packet receiver 23 and packet transmitter 32. The structure of the data link layer implementation will be explained in greater detail hereinafter. However, to all the features of the link layer not being important to the present invention it is also referred to the IEEE1394 bus standard. For exchanging information with one of the other layers as well as with the serial bus management item, a number of requests, configuration, indication and register access messages are depicted in FIG. 3, that will not be explained in detail here. These are standardised messages and it is also referred to the 1394 bus standard in order to disclose these messages. The functionality of the transaction layer 50 is also disclosed in the 1394 bus standard. There is no modification required for the implementation of the present invention here.

The serial bus protocols also include serial bus management, which provides the basic control functions and standard control and status registers (CSR) needed to control nodes or to manage bus resources. The bus manager component is only active at a single node exercising management responsibilities over the entire bus. At the nodes being managed (all those that are not the bus manager) the serial bus management consists solely of the node controller component. An additional component, the isochronous resource manager 42, centralises the services needed to allocate bandwidth and other isochronous resources. The isochronous resource manager 42, for example, is implemented by software means where a number of special purpose registers are defined for the isochronous resource manager. For example one of these registers corresponds to the information how much isochronous bandwidth is currently allocated for the network. These registers can be accessed from the data link layer. This will be utilized for the purpose of the implementation of the invention as explained later on.

Figure 4:
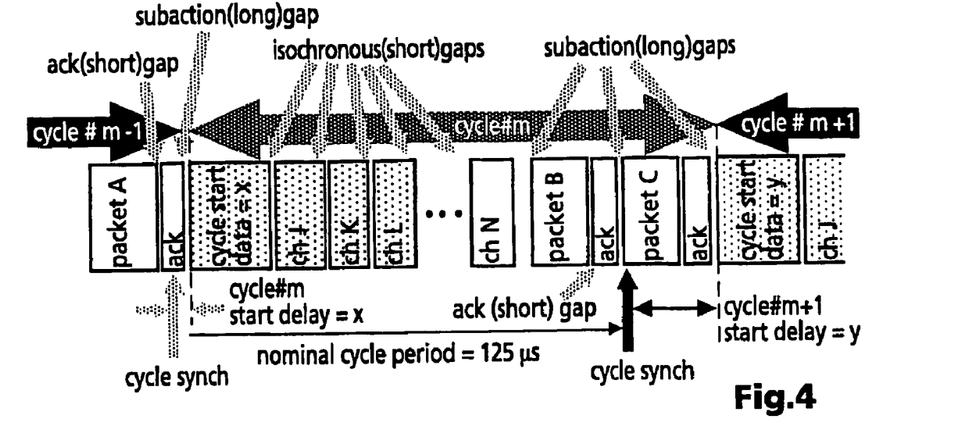
FIG. 4 shows the cycle structure according to the IEEE1394 bus protocol.

As already mentioned in the consistory clause of the application, the IEEE1394 bus standard provides for data transfer in cycle periods. Such a cycle period is shown in FIG. 4. The basic transfer mode is called a managed bus where a cycle master maintains a common clock over the network. In the cable environment, the highest priority node is a route and the cycle master must be the route. The cycle master tries to transmit a cycle start packet at specific intervals for example each 125 µs. If the transfer is in progress when the cycle synchronization event occurs, then the cycle start packet will be delayed, causing significant jitter in the start time of the transfer. Since this jitter is frequently unacceptable, the amount of time that the cycle start packet was delayed is encoded within the packet as a transaction layer quadlet write request broadcast to each node's cycle timer register. All the other nodes can synchronize their cycle timer register entries to this value. The nodes have a 32-bit cycle timer register. The low order 12 bits of the register are a modulo 3072 count, which increments once each 24.576 MHz clock period. The next 13 higher order bits are a count of 8 kHz cycles and the highest order 7-bits count seconds. A local synchronization event is generated in each of the nodes when the low order 12-bits of the cycle timer register wrap from 3071 to zero. This is equivalent to a cycle synchronization event in intervals of 125 µs. All nodes not being the cycle master respond to the occurrence of a local cycle synchronization event by waiting for a cycle start packet before making another transmission request. The nodes are waiting at least for the time period of a sub-action gap after a data transmission in progress when the cycle sync event occurred. After the reception of the cycle start packet they only have to wait for a shorter isochronous gap before setting their own isochronous transmission requests. All bus nodes not having isochronous data to transmit wait for another sub-action gap after the last isochronous data packet before they draw their own asynchronous transmission requests.

Figure 5:
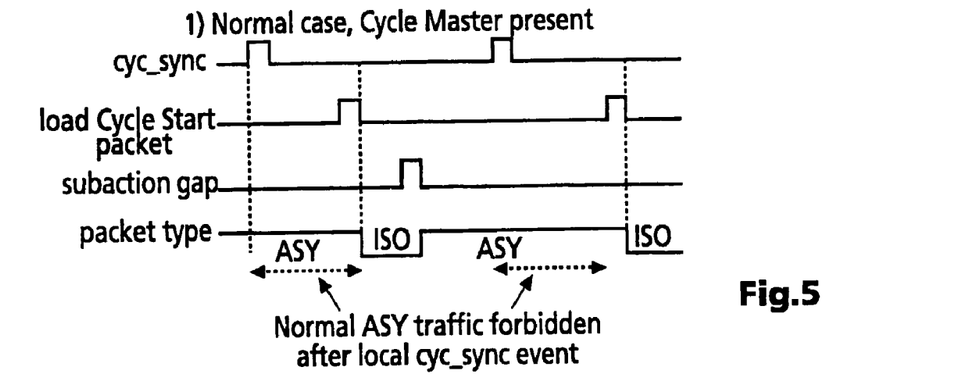
FIG. 5 shows a simplified diagram for illustrating the cycle master transfer mode.

The data transfer under the cycle master control is also depicted in FIG. 5 in simplified manner. On top of FIG. 5 is shown the local cycle sync event. The bus node having cycle master functionality waits for the end of the data transfer in progress and then generates and submits the cycle start packet over the bus. During all the time from the local cycle sync event until the end of the transmission of the cycle start packet all asynchronous transmission requests as well as isochronous transmission requests are forbidden. Asynchronous transmission requests remain forbidden in the following time period right after the reception of the cycle start packet in order to guarantee the isochronous data transmission first. This period ends with the occurrence of a sub-action gap on the bus behind the isochronous bus traffic. Shown in the third and fourth line of FIG. 5.

Figure 6:
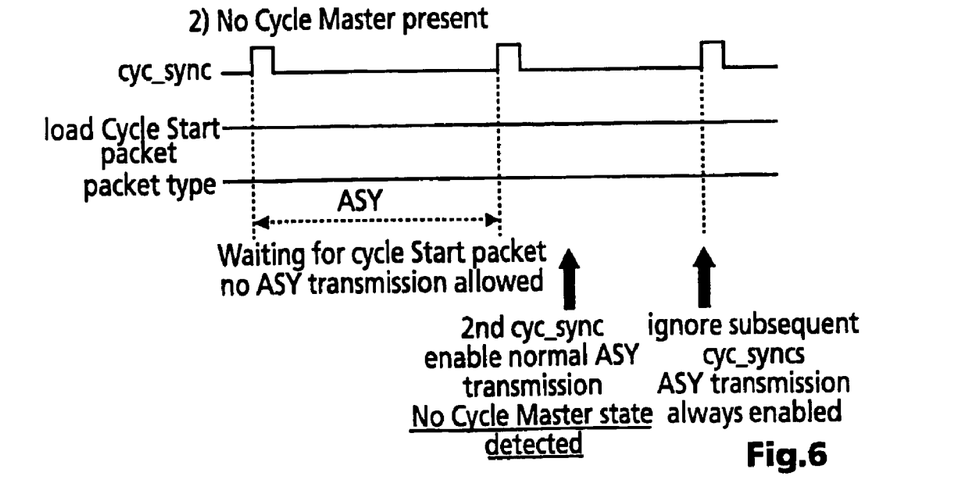
FIG. 6 shows the structure of the no cycle master transfer mode according to the invention.

With the invention a new transfer mode will be introduced with the main characteristic that no cycle master is present on the bus. This transfer mode will be entered after having firstly set up the normal transfer mode, where the timer registers had been synchronized. Then the no cycle master transfer mode will be entered after having detected that twice after the occurrence of the local cycle sync event no cycle start packet has been received. Line 3 of FIG. 6 shows that in the first cycle period after a local cycle sync event, the ordering of asynchronous transmission requests are forbidden. Only after not having received a cycle start packet behind the second local cycle sync event the asynchronous transmission requests are enabled and the no cycle master state is detected. Upon switching over to the no cycle master state the data link layer device is reconfigured to the no cycle master transfer mode in which subsequent local cycle sync events are ignored and asynchronous transmission requests are allowed during the whole cycle period.

Figure 7:
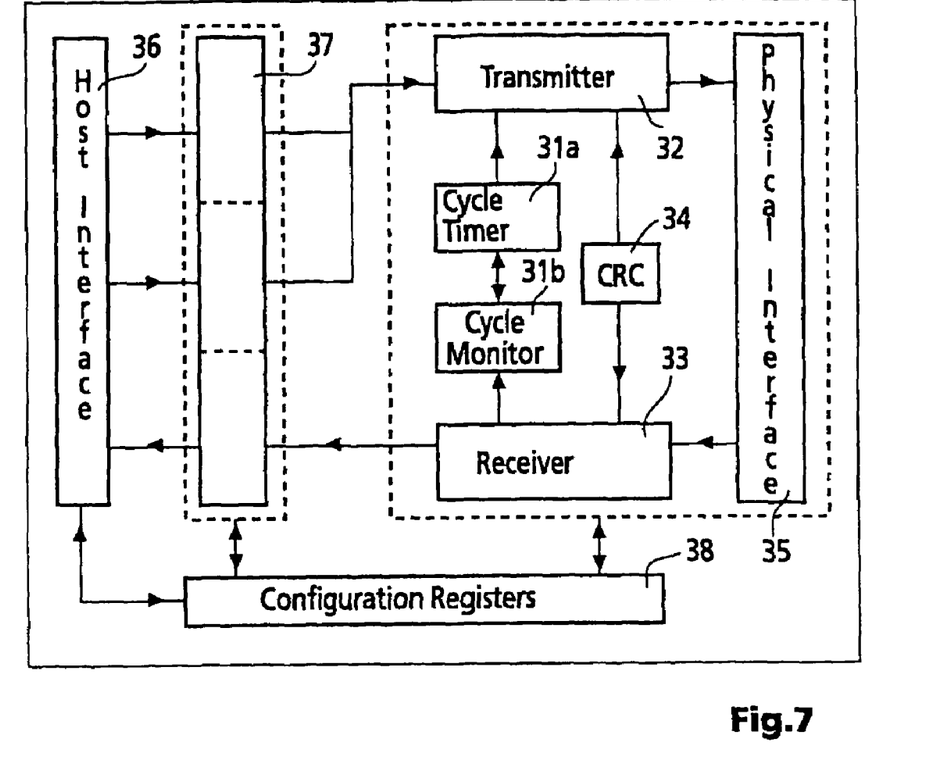
FIG. 7 shows a block diagram of a data link layer device.

In FIG. 7 the principle structure of the data link layer device is shown. Identical reference numbers with one of the foregoing drawings denote the same components as previously claimed. The structure of this data link layer device is based on the structure of the TSB12LV01A data link layer IC from Texas Instruments. For the purpose of the disclosure of the invention it is therefore also referred to the data sheet of this IC. The physical layer interface 35 interfaces on one hand to the transmitter and receiver components 32 and 33 and on the other hand it also interfaces to the physical layer chip and conforms to the PHY-Link interface specification described in Annex J of the IEEE1394 bus standard. The transmitter 32 retrieves data from the internal memory 37 and creates correctly formatted serial bus packets to be transmitted through the PHY interface 35.

The receiver takes incoming data from the PHY interface 35 and determines if the incoming data is addressed to this node. If the incoming packet is addressed to this node, the CRC of the packet header is checked in CRC calculation unit 34. If the header CRC is good, the header will be stored in the internal memory 37. The internal memory 37 is organized in two transmit FIFO and one receive FIFO. Each of these FIFO is a quadlet wide.

The cycle timer 31a is a 32-bit register. The cycle timer register consists of three fields, cycle offset, cycle count and seconds count. As explained before the low order 12-bits of the timer are a module 3072 counter, which increment once every 24.576 MHz clock period, thereby wrapping after exactly 125 μs. The next 13 higher order bits are a count of 8,000 Hz or 125 μs cycles and the highest 7-bits count seconds.

The cycle monitor 31b not only generates a local cycle sync event it also monitors the reception or transmission of cycle start packets. Hence it re-synchronizes the cycle timer with the entry of the received cycle start packet. The cycle monitor detects and counts missing cycle start packets after a local cycle sync event and makes the switch over to the no cycle master state as explained above.

The configuration registers 38 control the operation of the data link layer device in the well-known manner of the CSR (control and status register) architecture. The host bus interface 36 allows an easy connection to a host processor.

Figure 8:
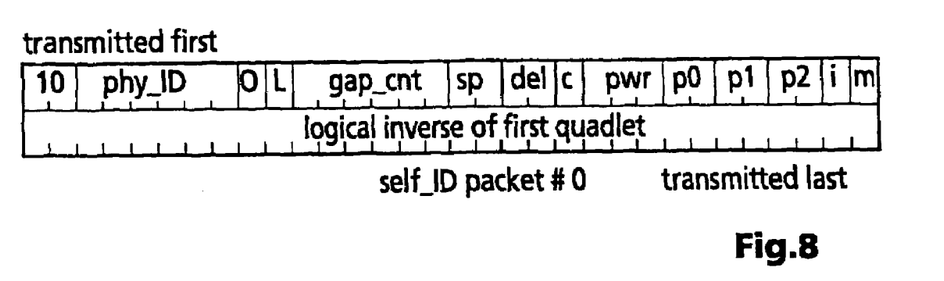
FIG. 8 shows the format of an IEEE1394 self identification packet.

In connection with FIG. 6 a first embodiment of how the data link layer device can be switched over to the no cycle master transfer mode has been explained. It is possible to do this switch over process in an alternative manner. This alternative solution is based on the analysis in the data link layer device of all the self identification packets collected from all bus nodes after a bus reset and stored in its internal memory. The structure of a self-identification packet is shown in FIG. 8. The first two bits correspond to the self-identification packet identifier. The following 6 bits relate to the physical node identifier of the sender of this packet. The L bit is set if an active link and transaction layer is present in the sender of this packet. The following 6 bits correspond to a gap count value. The 2 bits sp inform about the speed capabilities of the bus node sending this packet. The two bits dil inform about a worse case repeater data delay. The c bit is set if the sending node is a contender for a bus or isochronous resource manager. It is this bit which needs to be analysed in order to determine whether the no cycle master mode can be entered or not. The pwr bits inform about the power consumption and source characteristics of the node. The bits for the fields p0, p1, p2 inform about the port status of the sending node. The i bit is set if the sending node has initiated the current bus reset. The m bit indicates that another self-identification packet will follow for this node or not. The second quadlet in the self-identification packet #0 is a logical inverse of the first quadlet for error checking purposes. By evaluating whether in any one of the collected self-identification packets the c bit is set the data link layer cycle monitor 31b can find out if either isochronous traffic will occur or not. In case that none of the self identification packets have set the c bit, it is immediately clear, that there is no isochronous resource manager in the network and therefore that no isochronous service can be provided. In consequence an immediate switch over to the no cycle master state can be made. With this solution the switch over to the no cycle master state can be made faster in comparison to the previously explained solution according to FIG. 6.

Figure 9:
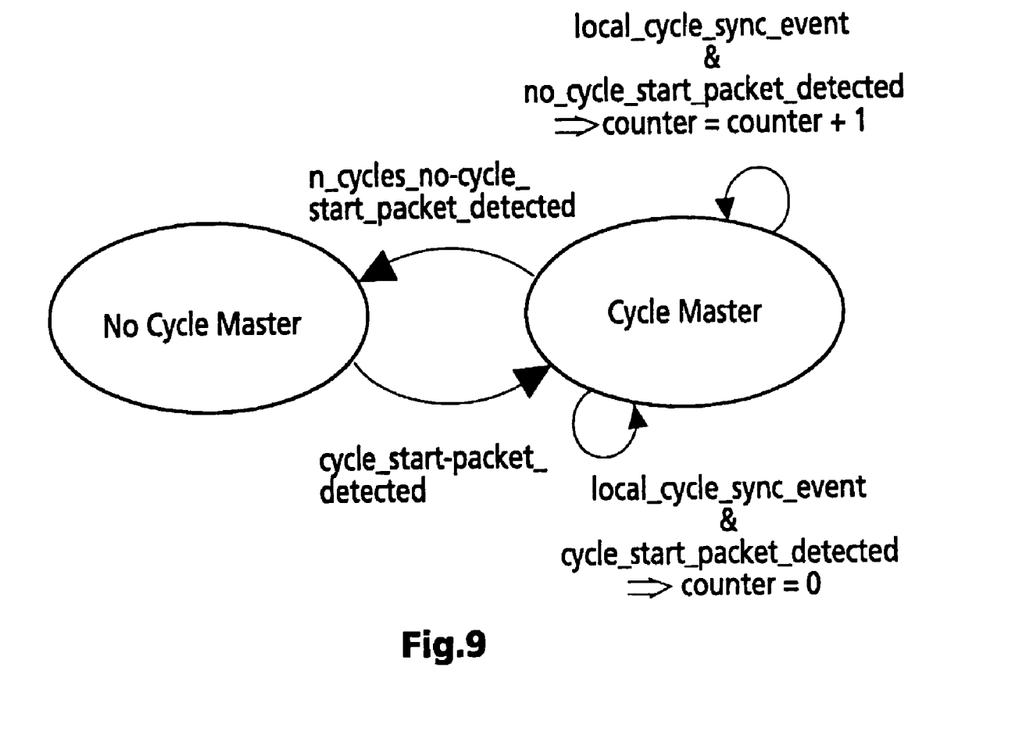
FIG. 9 shows a first state diagram for a data link layer device being configured as a cycle slave.
Figure 10:
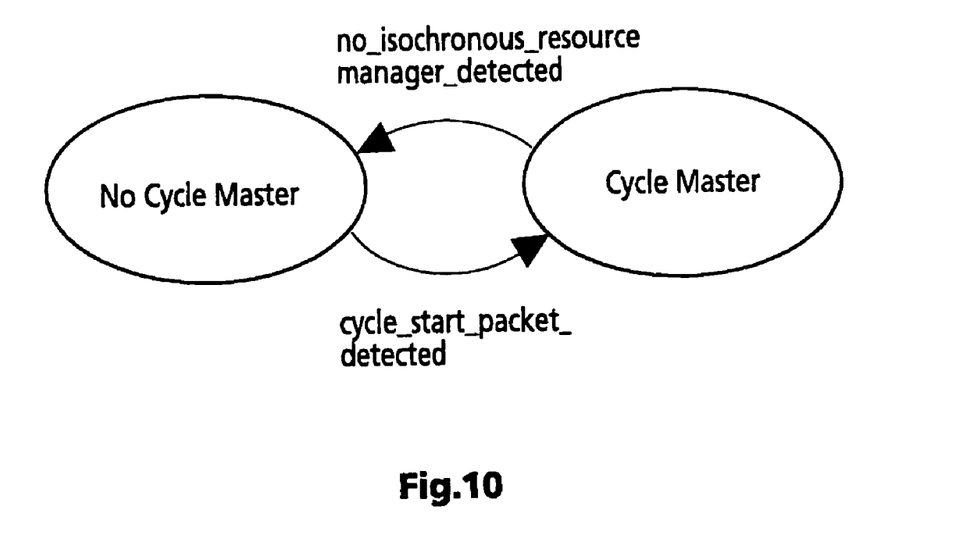
FIG. 10 shows a second state diagram for a data link layer device being configured as a cycle slave.

The two alternative solutions are also disclosed in the following FIGS. 9 and 10. FIG. 9 shows the state diagram for the first disclosed solution. In the cycle master state of the data link layer device each local cycle sync event followed by a cycle start packet detection resets a counter to the value zero. After detection of a local cycle sync event without following reception of a cycle start packet the counter will be incremented. The data link layer device switches over to the no cycle master state if the counter value has reached a predetermined value n. The no cycle master state will be left if a cycle start packet has been detected and the data link layer device goes back to the cycle master state.

In the state diagram for the alternative solution according to FIG. 10 it will be switched over to the no cycle master state if an evaluation of all the self identification packets has disclosed that none of the connected bus nodes contended for isochronous resource manager as described in connection with FIG. 8. Again, the no cycle master state will be left upon detection of a cycle start packet, then going back to the cycle master state.

The two alternatively disclosed solutions are appropriate for bus nodes that cannot act as a cycle master. For the situation shown in FIG. 1 this would be the case for all the peripheral devices 11, 12 and 13. The personal computer 10 however would have cycle master capability as well as isochronous resource capability. The data link layer device located in the personal computer 10 can however directly enter the no cycle master state if it was configured to be the root, the isochronous resource manager and the cycle master after the self configuration phase. It simply needs to draw a request to the isochronous resource manager requesting the information about the isochronous bandwidth allocation. This can be made by the cycle monitor 31b via the host interface 36 in the well-known manner. The host processor has a software register for the information about the allocated isochronous bandwidth. This will be read out via the host interface 36 and the cycle monitor 31b can switch over to the no cycle master state if no isochronous bandwidth had been allocated.

The invention claimed is:

1. Data link layer device for a serial communication bus comprising an interface to a physical layer unit and an interface to at least one host processor supporting the higher layers of the OSI/ISO data communication reference model, wherein, the data link layer device further comprises means for checking whether a cycle master capable of transmitting a cycle start packet for isochronous and asynchronous data transmissions over the serial communication bus exists in the network, comprising
configuration means that enable the generation of asynchronous transmission requests without waiting for an isochronous data transfer and a sub-action gap after occurrence of a local cycle sync event in order to support a no cycle master transfer mode, if the means for checking finds that no cycle master exists in the network.

2. Data link layer device according to claim 1 wherein the means for checking whether a cycle master exists in the network comprises
a memory storing self-identification packets from all the nodes in the network, and
evaluating means for checking whether, in one of the self-identification packets, an entry is found that indicates that the corresponding node is a contender for an isochronous resource manager.

3. Data link layer device according to claim 1, wherein the means for checking whether a cycle master exists in the network comprises
a first counter for counting clock pulses of a reference clock, the counter generating a cycle synchronization event each time after a predetermined counting interval, and a second counter that is incremented each time that no cycle start packet has been received in succession to a cycle synchronization event, thereby activating said configuration means if the second counter reaches a predetermined value.

4. Data link layer device according to claim 1 wherein the means for checking whether a cycle master exists in the network comprises a memory storing the self-identification packets from all the nodes in the network and evaluating means for checking whether in one of the self-identification packets an entry is found that indicats that the corresponding node is a contender for an isochronous resource manager.

5. Data link layer device according to claim 1, wherein the means for checking whether a cycle master exists in the network comprises a first counter counting clock pulses of a reference clock, the counter generating a cycle synchronization event each time after a predetermined counting interval, and a second counter that is incremented each time that no cycle start packet has been received in succession to a cycle synchronization event, thereby activating said configuration means if the second counter reaches a predetermined value.

* * * * *